Oct. 3, 1961
J. L. WEININGER
3,003,017
SOLID ELECTROLYTE CELL
Filed Aug. 27, 1959
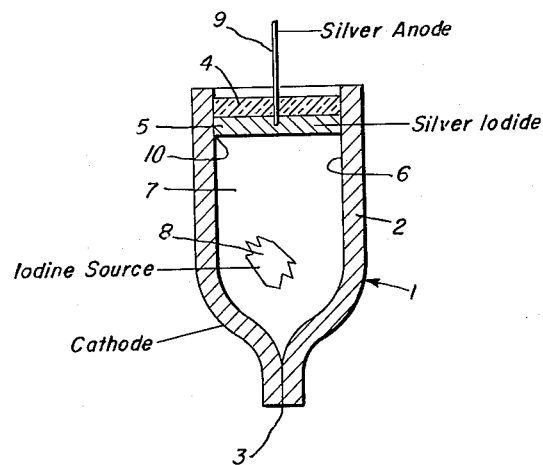
Inventor:
Joseph L. Weininger,
by James H. Underwood
His Agent.

3,003,017
SOLID ELECTROLYTE CELL
Joseph L. Weininger, Scotia, N.Y., assignor to General Electric Company, a corporation of New York
Filed Aug. 27, 1959, Ser. No. 836,451
17 Claims. (Cl. 136—100)

This invention relates to galvanic cells and specifically to galvanic cells which contain solid electrolytes. This invention also relates to galvanic cells which are inactive and have indefinite shelf life until heated to at least a minimum above-ambient temperature.

This application is a continuation-in-part of my application Serial No. 686,661, filed September 27, 1957, now abandoned, and assigned to the same assignee as the present invention.

Galvanic cells which contain solid electrolytes are desirable as low current sources for electrical devices, for example, for transistors, radiation meters, amplifiers, image tubes, exposure meters, alarm circuits, etc., and for charging of capacitors. It is particularly desirable that such cells be compact and leak-proof and it is also particularly desirable that such cells be operative over a wide temperature range including elevated temperatures in excess of 150° C. Many applications require that the cells be in an inactive state and have an indefinite lifetime when stored at moderate temperatures, but also require that the cells become active when subjected to a definite above-ambient temperature. Some applications require that the cell become inactive if the temperature falls below the activation temperature while other applications require that the cell remain active for its entire useful life once it has been activated even though the temperature does fall below the activation temperature.

Among the cells suggested for applications in which low currents are required are the solid electrolyte cells. In general, these cells are quite satisfactory for operation at room temperature but are completely unsatisfactory for operation at temperatures as high as 150° C. In addition, the structure of these solid electrolyte cells is usually somewhat complicated. Furthermore, when attempts are made to operate the usual solid electrolyte cell at a high temperature such as a temperature in excess of 150° C., there is considerable thermal decomposition of some of the usual cell elements and in addition, there is usually a severe attack by the electrolyte on the electrodes.

Accordingly, it is an object of my invention to provide an improved, solid electrolyte cell.

It is another object of this invention to provide a solid electrolyte cell which is simple in construction and easily assembled.

It is a still further object of my invention to provide a solid electrolyte cell which is operable at temperatures above about 150° C.

It is another object of my invention to provide a solid electrolyte cell which is inactive at moderate temperature, but which is activated when heated to a chosen above-ambient temperature.

It is another object of my invention to provide solid electrolyte cells which remain active once they are heated above the activation temperature.

It is also an object of my invention to provide solid electrolyte cells which will become inactive whenever the temperature falls below the activation temperature.

In one embodiment of my invention, the completed cell comprises an iodine source inside a container whose open end is sealed with an electrical insulating composition. A layer of silver iodide is provided inside the tube and in contact with a portion of the internal wall of the inert metal tube usually adjacent to the insulating seal. A silver lead extends through the insulating seal and into the layer of silver iodide. Normally, the complete unit is hermetically tight to prevent escape of any of the ingredients.

My invention, both as to its construction and operation, together with further objects, features and advantages thereof, will be better understood from the following description taken in connection with the drawing which is an enlagred, elevational, sectional view of the preferred cell of my invention.

In the drawing a completed solid electrolyte cell which is indicated generally at 1 comprises an inert metal cathode in the form of a tube 2 which is sealed at one end 3 by any suitable means such as cold welding. The other end of the tube is sealed by an electrical insulating composition 4. A layer 5 of silver iodide is in contact with the interior wall 6 of the cell and is positioned in the region of and can be in contact with insulating composition 4. The space 7 between silver iodide layer 5 and the bottom of the cell 3 contains an iodine producing material or source 8. A silver wire anode or electrode 9 extends through insulating composition 4 and into silver iodide layer 5. Normally, the entire assembly is hermetically sealed to prevent escape of any of the contents.

The two half cell reactions involved in this cell result in the conversion of silver to silver iodide. At the anode 9, silver is converted to silver ions with the release of electrons, and at the cathode, iodine absorbs electrons to form iodide ions. The anode reaction takes place at the interface between the silver anode 9 and the silver iodide layer 5. The cathode reaction takes place at the interface 10 between metal cathode tube 2 and silver iodide layer 5. As is seen from the chemistry of cell 1 inert metal tube 2 provides two functions in addition to its function as a conductor of electrons. First, tube 2 provides a housing for the cell. Second, inert metal tube 2 serves as the locus at which the cathode reaction takes place. From these functions of metal tube 2, it is seen that tube 2 must be a conductor of electricity and it must be inert to the action of the iodine within space 7. Any metal which meets these characteristics is satisfactory for the construction of tube 2. Preferably, tube 2 is formed of tantalum or platinum. However, other metals having the required characteristics for this cell include, for example, nickel, ruthenium, rhodium, palladium, osmium and iridium. In addition to pure metals, alloys may also be employed for tube 2. Suitable alloys include, for example, the various commercially available nickel-chromium alloys, nickel-cobalt alloys, iron-nickel-chromium alloys, etc.

From the description of cell 1 it is seen that an iodine source 8 must be provided to support the cathode reaction. When it is desired to have cells which are always active, i.e., do not have to be heated to a maximum elevated temperature before they will operate, the most suitable source of iodine is elemental iodine, and is to be preferred for such cells. The amount of iodine employed in the cell may vary within wide limits. However, I prefer to have sufficient iodine in space 8 so that an equilibrium is established between solid or liquid elemental iodine 8 and iodine vapor in the space 7. Furthermore, it is desirable that the amount of iodine be sufficient to utilize as much of the silver in the anode as possible in the chemical reaction of the cell.

With but very few exceptions, it is desirable to prevent loss of iodine by hermetically sealing the cells. Because of this, it is desirable that the pressure within the cell be limited so that the cost and problems involved in insuring that the cell will not rupture at the highest temperature of operation are not out of line with the cost and problems of using alternate means. In order to minimize the internal pressure, it is desirable to evacuate the cell during manufacture so that the vapor pressure of the iodine source is the only pressure within the cell. It will be recognized, however, that from an operational point of view there is no reason why my cells cannot be made so that they can withstand high internal pressures since it is well known in the art how to hermetically seal insulating sealing material 4, for example, a ceramic washer, to both the silver wire anode 9 and to the metal cathode 2, using, for example, soldered ceramic-to-metal seals, glass-to-metal seals, etc. With pure elemental iodine as the source of iodine vapor in the space 7, the upper limit of the operation of cell 1 at one atmosphere pressure within the cell is about 188° C., which is the boiling point of iodine at one atmosphere pressure. Thus, the cells of the present invention in which elemental iodine is used as the iodine source are operable at a temperature up to about 188° C. without exceeding a pressure of one atmosphere in the cell.

Where it is desired to operate cell 1 at an internal pressure of one atmosphere and a temperature above the boiling point of iodine, or to have a cell which is inactive at moderate temperatures, for example, below 100° C., the iodine source 8 preferably comprises a material which will liberate iodine vapor at elevated temperatures. One very satisfactory source for iodine is the polyiodides of cesium. Cesium tetraiodide starts to liberate iodine at 138° C. In the temperature range of 138°–211° C. the cesium tetraiodide is in equilibrium with iodine and cesium triiodide. In the temperature range of 211°–308° C. cesum triiodide, whether present as the initial iodine source or formed from the above equilibrium reaction of cesium tetraiodide, is in equilibrium with iodine and cesium iodide (CsI). Above 308° C., the cesium triiodide is completely decomposed into iodine and cesium iodide. These temperatures are valid for an iodine vapor pressure of one atmosphere. As will be readily understood an increase in iodine vapor pressure above one atmosphere elevates the temperature while a decrease in pressure below one atmosphere decreases the temperature for the above reactions, but the effect is only a matter of no more than a few degrees for pressures up to about 100 atmospheres. Thus, with cesium tetraiodide as the source 8 of iodine, the cells of the present invention are operable up to about 308° C. without exceeding a pressure of one atmosphere within the cell. A still further source of iodine is iodine adsorbed on charcoal. This may be prepared by heating charcoal up to a temperature of about 550° C. in iodine vapor at a pressure of one atmosphere, and then allowing the system to cool. During the cooling process iodine will be adsorbed by the charcoal to yield an iodine source 8 which may be employed when it is desired to operate the cells of the present invention at a temperature up to about 550° C. without exceeding a pressure of one atmosphere.

The 550° C. maximum operation temperature of cell 1 is based on the fact that the silver iodide electrolyte melts at 550° C. However, if suitable provisions are made, such as having the cell so that the silver iodide layer remains on the bottom of the cell, for example, the cell as shown in FIG. 1 is inverted; or if the cell is operated in a non-gravity field, for example, in a space vehicle in outer space, then melting of the silver iodide does not affect the operation of the cell as long as there is no failure from other sources and the materials remain in the same relative relationship to each other.

In addition to the above two cesium polyiodides, other compounds which yield iodine when heated, may be used. For example, bismuth triiodide, germanium tetraiodide, magnesium iodide, rubidium triiodide, iodine tetraoxide, iodine pentoxide, iodic acid, iodoform, carbon tetraiodide, etc. In general, the decomposition of metallic iodides is a reversible reaction so that whenever the temperature of a cell incorporating one of these activators falls below the decomposition temperature of the iodine compound source, the cell becomes inactive as the iodine recombines but becomes active whenever the temperature is at or above the decomposition temperature. One or more of these compounds may be used in a single cell or a battery may be made joining in parallel or series circuits one or more cells with one or more iodine source with one or more groups of cells each with one or more different iodine sources to give different amperages at different temperatures.

When it is desired to have cells which are inactive initially but become active once they have been heated above a certain minimum above-ambient temperature and remain active even if the temperature later falls below the activation temperature, I use an iodine source which is itself not thermally decomposable, at least below 550° C., in conjunction with a compound which reacts with the iodine source to release iodine when heated to a specific minimum above-ambient temperature. Such compounds are, for example, the metallic iodides of copper, cobalt, nickel, lead, zirconium, tungsten, calcium, zinc, iron, etc., which in the presence of oxygen or oxidizing agents, for example, potassium permanganate, potassium iodate, sodium perchlorate, etc., are oxidized to produce elemental iodine. For example, the reaction of cuprous iodide and oxygen requires an activation temperature of 240° C. and the oxidation of cuprous iodide with potassium iodate requires an activation temperature of 330° C.

The decomposition and oxidation of iodides is described in detail in such publications as "A Comprehensive Treatise on Inorganic and Theoretical Chemistry," vol. II, J. W. Mellor, Longmans Green and Co., London, 1922; "Chemical Elements and Their Compounds," N. V. Sidgwick, Oxford University Press, London, 1950; Gmelin's Handbuch der Amorg. Chem., 8th edition, Berlin, 1933; "Journal of the Electrochemical Society," 106 [6], 475–81 (1959) and the references referred to in these publications. Cells which are activated by this type of reaction must be made to resist high internal pressure if gaseous oxygen or air is used as the oxidizing agent in order that enough oxygen will be present to oxidize the iodide compound. As an alternative, pin holes may be provided in the cell which permit surrounding air or oxygen to diffuse into the cell as the oxygen is depleted in the internal cell atmosphere or by using the above-mentioned oxidizing agents which generate oxygen at a rate commensurate with its consumption in the reaction to release iodine.

Since silver conductor 9 serves as the anode of cell 1 and inert metal tube 2 serves as the cathode, it is necessary to provide a sealing means 4 to seal the end of tube 2 and silver anode 9 and also to insulate anode 9 from tube 2. Sealing means 4 should be stable at the temperatures to which the cell is to be subjected. Any suitable insulating sealer may be employed for this purpose. In selecting the insulating sealer 4 it is advisable to choose a material which has the same coefficient of expansion as metal tube 2, or is mechanically strong enough to resist the strain since cell 1 is operable over a wide temperature range and there is some expansion and contraction of tube 2 while the tube is being brought to operating temperature and cooled back down to room temperature.

One satisfactory insulating sealing means for sealer 4 is prepared by mixing two parts of powdered aluminum silicate, one part of freshly calcined aluminum phosphate, three parts of powdered alumina, and one part of powdered fused quartz with sufficient concentrated phosphoric acid to form a paste. On heating this paste to a temperature of about 125° C. a stone-like mass is formed which has a coefficient of expansion which approximates the coefficient of expansion of inert metal tube 2 when this tube is formed of tantalum. By varying the relative quantities of powdered alumina and powdered fused quartz in this cement composition, an insulating sealer having a coefficient of expansion approximating that of any of the other metals enumerated for inert metal tube 2 may also be formed. In addition, many other well known insulating cements, as well as ceramic and glass compositions which can be sealed or soldered to the metal cathode, for example as disclosed in 2,071,196—Burger et al. and 2,282,196—Underwood, may be employed for insulating sealing layer 4.

In the manufacture of the cells of the present invention, the first step is the insertion of silver iodide layer 5 into inert metal tube 2. The size of metal tube 2 is immaterial to the present invention. However, for purposes of miniaturization, it is preferable to have tube 2 as small as possible, commensurate with the volume necessary to accommodate the iodine vapor. Thus, satisfactory cells within the scope of the present invention can be formed with inert metal tubes having internal diameters of from $\frac{1}{32}$ to $\frac{1}{8}$ inch with a wall thickness of from 5 to 20 mils. One simple method for the insertion of silver iodide layer 5 into tube 2 is to dip one end of an inert metal tube into molten silver iodide or into a bead of molten silver iodide, preferably in a dry, inert gas atmosphere, for example nitrogen. Heat conduction by the tube 2 will serve to solidify the silver iodide. By suitable control of the time in which tube 2 is inserted in the molten silver iodide or the bead of silver iodide, it is possible to control the precise position of silver iodide layer 5 in relation to the end of tube 2. If the position of layer 5 is not satisfactory, the position may be changed by heating the tube 2 momentarily and allowing silver iodide layer 5 to move by gravity to the desired position.

Silver anode 9, which may be in the form of a round wire or any other convenient shape, is positioned within silver iodine layer 5, for example, by heating the silver anode 9 to a temperature above the 550° C. melting point of silver iodide and allowing the silver anode to "melt" its way into the silver iodide layer. The depth of anode 9 in the silver iodide layer 5 is not critical. If anode 9 extends all the way through layer 5 into space 7 the exposed silver is subject to attack by the iodine vapors but this soon forms a layer of silver iodide in the presence of iodine vapors.

The next step in the assembly of cell is to place insulating sealing material 4 in place. However, this step may be postponed until after the evacuation step if the silver iodide is so positioned that it acts as a temporary seal for the tube 2. When material 4 is in the form of a paste, it is merely positioned in the end of tube 2 adjacent to layer 5. This intermediate assembly is heated at a temperature of about 125° C. to "cure" the layer 4 into a rock-like material. After iodine source 8 is positioned in the open end of tube 2, the open end of the tube is sealed off. Since the cells of the present invention are necessarily subjected to a wide range of temperatures, for example from room temperature up to the melting point of silver iodide (550° C.), it is desirable to evacuate space 7 prior to sealing of tube 2 so as to prevent excessive pressure build-up in the tube. In practice, after insertion of iodine source 8 into space 7, the tube 2 is evacuated to a pressure of from a few microns up to about 350 millimeters. While under vacuum the tube is conveniently cold welded so as to form the type of joint shown at 3. This cold welding operation is accomplished by merely pinching the end of tube 2 under sufficient pressure so that cold welding of the end of the tube is effected. This cold welding may be accomplished by shearing the end of tube 2 or by running tube 2 through suitable rolls. After the cold welding operation is effected, cell 1 is ready for operation. Alternatively, the end may be closed by other well known sealing means providing they do not cause displacement of the relative position of the cell elements.

EXAMPLE 1

A cell was constructed in accordance with the drawing employing a tantalum tube having a diameter of $\frac{5}{64}$ inch with a wall thickness of 8 mils. The total length of the tube was $\frac{1}{8}$ inch. The insulating sealing layer was approximately 33 mils thick and was prepared from a paste containing, by weight, one part of freshly calcined aluminum phosphate, two parts of aluminum silicate, three parts alumina, two parts of fused quartz and two parts of concentrated phosphoric acid. The silver iodide layer in the cell was 4 mils thick. Prior to cold welding the end of the cell, the cell was evacuated to a pressure of 20 microns after placing 0.2 grams of iodine crystals therein. This cell had a room temperature potential (25° C.) of 0.67 volt. At 75° C. this cell had a potential of 0.67 volt and a short circuit current of 3 microamperes.

EXAMPLE 2

A cell similar to that just described was prepared employing a platinum tube instead of a tantalum tube. At 170° C. this cell had an open circuit potential of 0.67 volt and produced a short circuit current of 6.7 milliamperes.

EXAMPLE 3

Another cell similar to the tantalum tube cell described in Example 1 was prepared with cesium tetraiodide in place of the iodine crystals. This cell was inactive until heated to 138° C. At about 300° C. this cell had a short circuit current of 4.0 milliamperes and an open circuit voltage of 0.645 volt. This cell produced 3 milliamps at 0.3 volt.

EXAMPLE 4

Silver iodide cells were made similar to Example 3 except that activators and operating conditions were used as shown in the following table. In several cases the cells were joined to form a battery.

*Table 1*

PERFORMANCE OF AgI CELLS WITH THERMALLY ACTIVATED IODINE COMPOUNDS AS IODINE SOURCES

| No. of Cells in Series | OD [1] of Ta-tube, cm. | Depolarizer | Temp. of Operation, ° C. | Open-cell voltage, v. | Short-circuit current, ma. | Internal Resistance, ohms | Capacity, ma.-hr. | Temp. (° C.) at which Activated |
|---|---|---|---|---|---|---|---|---|
| 1 | 0.318 | $CsI_4$ | 250 | 0.675 | 1.5 | 440 | 5.23 | 138 |
| 1 | 0.159 | $CsI_4$ | 300 | 0.63 | 0.5 | 1,510 | 0.37 | 138 |
| 4 | 0.318 | $CsI_4$ | 225 | 2.55 | 5.8 | 250 | 7.19 | 138 |
| 1 | 0.318 | $CsI_4$ | 265 | 0.60 | 11.0 | 55 | 3.76 | 138 |
| 5 | 0.318 | $CsI_3$ | 250 | 3.25 | 6.0 | 540 | 0.85 | 211 |
| 1 | 0.318 | $BiI_3$ | 308 | 0.59 | 3.0 | 200 | 3.22 | 308 |
| 1 | 0.318 | $CHI_3$ | 287 | 0.63 | 2.2 | 320 | 0.31 | 177 |
| 1 | 0.318 | $CI_4$ | 170 | 0.68 | 6.0 | 120 | 10.1 | 150 |
| 1 | 0.318 | $CI_4$ | 180 | 0.655 | 2.4 | 270 | 11.2 | 150 |

[1] Outside diameter of the tantalum tube.

EXAMPLE 5

Cells were made as described in Example 1 except that the iodine was replaced with cuprous iodide and the oxidizing agents shown in Table II. In the case of air, the cell was not evacuated and contained pinholes which permitted air to diffuse into the cell. All of the other cells were evacuated and hermetically sealed.

*Table II*

PERFORMANCE OF AgI CELLS WITH $Cu_2I_2$ PLUS OXIDIZING AGENT AS IODINE SOURCES

| Oxidizing Agent | Temp. of Operation, °C. | Open-cell voltage, v. | Short-circuit current, ma. | Internal Resistance, ohms | Capacity, ma.-hr. | Temp. at which Cell was Activated |
|---|---|---|---|---|---|---|
| Air | 450 | 0.95 | ~34 | 28 | 8.58 | 240 |
| Air | 422 | 0.45 | ~12 | 35 | 5.23 | 240 |
| $KMnO_4$ | 450 | 0.60 | 3.0 | 120 | 2.6 | 330 |
| $KMnO_4$ | 330 | 0.56 | 1.2 | 625 | 5.5 | 330 |
| $KMnO_4$ | 450 | 0.45 | | | 0.53 | 330 |
| $KIO_3$ | 258 | 0.55 | ~2.5 | 200 | 14.43 | 258 |
| $KIO_3$ | 287 and 360 | 0.66 | >10 | 11 | 5.22 | 258 |
| $KIO_3$ | 275 | 0.655 | 1.2 | 1,320 | 7.78 | 258 |

Heretofore, the cells of the present invention have been described as preferably operable at a temperature of at least about 150° C. It should be understood that the cells of the present invention are also operable at temperatures below 150° C. unless of the type which are activated by the equilibrium decomposition of polyiodides at higher temperatures. The higher operating temperature is preferred, however, because of the fact that silver iodide undergoes a phase transition at about 145° C. and the phase which is stable above 145° C. has a much higher ionic conductivity than the phases which are present below 145° C. This high ionic conductivity above 150° C. reduces the internal resistance of the cell and allows a higher current density than at lower temperatures.

However, when up to 5 mole percent of another metallic iodide, for example, lead iodide or cadmium iodide is added to the silver iodide, there is a lowering of the phase transformation temperature with only a slight, tolerable loss in ionic conductivity of the silver iodide. As shown in Table III, the addition of up to 5 mole percent of lead iodide lowers the phase transformation temperature to about 100° C.

*Table III*

DATA PERTAINING TO $\alpha$-AgI

| Mole percent $PbI_2$, percent | Transformation Temperature, °C. | Conductivity of alpha phase in $ohm^{-1}cm.^{-1}$ |
|---|---|---|
| 0 | 144.6 | 0.6 |
| 1 | 132 | $3.6 \times 10^{-2}$ |
| 2 | 125 | $2.3 \times 10^{-2}$ |
| 3 | 120 | $2.2 \times 10^{-2}$ |
| 4 | 114.5 | $2.0 \times 10^{-2}$ |
| 5 | 100.5 | $1.8 \times 10^{-2}$ |

While other modifications of this invention and variations of the structure which may be employed within the scope of the invention have not been described, the invention is intended to include all such as may be embraced within the following claims.

What I claim as new and desire to secure by Letters Patent of the United States is:

1. A solid electrolyte cell comprising an inert metal container open only at one end, insulating means sealing said container at said open end, a layer of silver iodide containing from 0 to 5 mole percent of an iodide of a metal other than silver as a phase transformation modifier within said container adjacent said insulating means and in contact with the wall of said container, an iodine source positioned in said container, and a silver electrode extending in gas-tight relationship through said insulating means into said silver iodide layer.

2. A solid electrolyte cell as described in claim 1 wherein the inert metal container is fabricated of tantalum.

3. A solid electrolyte cell as described in claim 1 wherein the inert metal container is fabricated of platinum.

4. A solid electrolyte cell as described in claim 1 wherein the iodine source is iodine.

5. A solid electrolyte cell as described in claim 1 wherein the silver iodide contains up to 5 mole percent of a metallic iodide selected from the class consisting of cadmium iodide and lead iodide.

6. A solid electrolyte cell as described in claim 1 wherein the silver iodide contains up to 5 mole percent of lead iodide.

7. A solid electrolyte cell as described in claim 1 wherein the silver iodide contains up to 5 mole percent of cadmium iodide.

8. A solid electrolyte cell which is incapable of producing electric current until heated to a minimum above-ambient temperature, said cell comprising an inert metal container open only at one end, insulating means sealing said container at said open end, a layer of silver iodide containing from 0 to 5 mole percent of an iodide of a metal other than silver as a phase transformation modifier within said container adjacent said insulating means and in contact with the wall of said container, a silver electrode extending in gas-tight relationship through said insulating means into said silver iodide layer, and an iodine source which produces iodine when heated to an above-ambient temperature.

9. A solid electrolyte cell which is inactive until heated to a temperaaure greater than 138° C. comprising, an inert metal container open only at one end, insulating means sealing said container at said open end, a layer of silver iodide containing from 0 to 5 mole percent of an iodide of a metal other than silver as a phase transformation modifier within said container adjacent said insulating means and in contact with the wall of said container, a silver electrode extending in gas-tight relationship through said insulating means into said silver iodide layer, and an iodine source comprising a cesium polyiodide positioned in said container.

10. A solid electrolyte cell as described in claim 9 wherein the cesium polyiodide is cesium tetraiodide.

11. A solid electrolyte cell which is inactive until heated to a temperature of at least 308° C., said cell comprising an inert metal container open only at one end, insulating means sealing said container at said open end, a layer of silver iodide containing from 0 to 5 mole percent of an iodide of a metal other than silver as a phase transformation modifier within said container adjacent said insulating means and in contact with the wall of said container, a silver electrode extending in gas-tight relationship through said insulating means into said silver iodide layer, and an iodine source comprising bismuth triiodide positioned in said container.

12. A solid electrolyte cell which is inactive until heated to a temperature of at least 177° C., said cell comprising an inert metal container open only at one end, insulating means sealing said container at said open end, a layer of silver iodide containing from 0 to 5 mole percent of an iodide of a metal other than silver as a phase transformation modifier within said container adjacent said insulating means and in contact with the wall of said container, a silver electrode extending in gas-tight relationship through said insulating means into said silver iodide layer, and an iodine source comprising iodoform positioned in said container.

13. A solid electrolyte cell which is inactive until heated to a temperature of at least 330° C., said cell comprising, an inert metal container open only at one end, insulating means sealing said container at said open end, a layer of silver iodide containing from 0 to 5 mole percent of an iodide of a metal other than silver as a phase transformation modifier within said container adjacent said insulating means and in contact with the wall of said container, a silver electrode extending in gas-tight relationship through said insulating means into said silver iodide layer, and an iodine source comprising a mixture of cuprous iodide and potassium permanganate positioned in said container.

14. The method of forming a solid electrolyte cell which comprises, positioning a layer of silver iodide containing from 0 to 5 mole percent of an iodide of a metal other than silver as a phase transformation modifier in contact with the inner wall at one end of an inert metal tube, heating a silver electrode above the melting point of said silver iodide and inserting said electrode into said silver iodide, sealing the end of said tube adjoining said silver iodide layer with an electrical insulator which insulates said tube from said silver electrode, inserting an iodine source in said tube, evacuating said tube, and hermetically sealing said tube to form a sealed unitary assembly.

15. The method of making a solid electrolyte cell which is activated to generate electricity only when heated to a minimum above-ambient temperature which comprises, positioning a layer of silver iodide containing from 0 to 5 mole percent of an iodide of a metal other than silver as a phase transformation modifier in contact with the inner wall at one end of an inert metal tube, heating a silver electrode above the melting point of said silver iodide and inserting said electrode into said silver iodide, sealing the end of said tube adjacent said silver iodide layer with an electrical insulator which insulates the wall of said tube from said silver electrode, inserting in said tube an iodine source which generates iodine when heated to an above-ambient temperature, evacuating said tube, and hermetically sealing said tube to form a sealed unitary assembly.

16. A solid electrolyte cell which is inactive until heated to a temperature of at least 258° C., said cell comprising, an inert metal container open only at one end, insulating means sealing said container at said open end, a layer of silver iodide containing from 0 to 5 mole percent of an iodide of a metal other than silver as a phase transformation modifier within said container adjacent said insulating means and in contact with the wall of said container, a silver electrode extending in gas-tight relationship through said insulating means into said silver iodide layer, and an iodine source comprising a mixture of cuprous iodide and potassium iodate positioned in said container.

17. A solid electrolyte cell as described in claim 16 wherein the inert metal container is fabricated of tantalum.

References Cited in the file of this patent

UNITED STATES PATENTS

| Re. 24,408 | Hack et al. | Dec. 17, 1957 |
| 2,689,876 | Lehovec | Sept. 21, 1954 |
| 2,690,465 | Broder | Sept. 28, 1954 |
| 2,778,754 | Shorr | Jan. 22, 1957 |
| 2,847,493 | Smyth et al. | Aug. 12, 1958 |
| 2,894,053 | Louzos | July 7, 1959 |
| 2,905,740 | Smyth et al. | Sept. 22, 1959 |
| 2,953,620 | Smyth et al. | Sept. 20, 1960 |